United States Patent
Chiu et al.

(10) Patent No.: US 9,418,484 B2
(45) Date of Patent: Aug. 16, 2016

(54) LEARNING SYSTEM WITH AUGMENTED REALITY AND RELATED LEARNING METHOD USING MOBILE DEVICE TO CONDUCT SIMULATIONS AND OPERATIONAL TRAINING

(71) Applicant: National Taiwan Normal University, Taipei (TW)

(72) Inventors: Mei-Hung Chiu, Taipei (TW); Wei-Tian Tang, Taipei (TW); Chin-Cheng Chou, Taipei (TW)

(73) Assignee: National Taiwan Normal University, Taipei (TW)

( * ) Notice: Subject to any disclaimer, the term of this patent is extended or adjusted under 35 U.S.C. 154(b) by 11 days.

(21) Appl. No.: 14/339,776

(22) Filed: Jul. 24, 2014

(65) Prior Publication Data

US 2015/0029183 A1      Jan. 29, 2015

(30) Foreign Application Priority Data

Jul. 25, 2013   (TW) .............................. 102126615 A

(51) Int. Cl.
  *G06T 19/00*   (2011.01)
  *G06F 17/30*   (2006.01)
  *G09B 5/02*    (2006.01)

(52) U.S. Cl.
  CPC ........ *G06T 19/006* (2013.01); *G06F 17/30247* (2013.01); *G06F 17/30867* (2013.01); *G09B 5/02* (2013.01)

(58) Field of Classification Search
  None
  See application file for complete search history.

(56) References Cited

U.S. PATENT DOCUMENTS

2011/0282641 A1* 11/2011 Xenos ................. G06F 17/5009 703/19

* cited by examiner

*Primary Examiner* — Said Broome
(74) *Attorney, Agent, or Firm* — Mintz Levin Cohn Ferris Glovsky and Popeo, P.C.; Peter F. Corless; Steven M. Jensen

(57) ABSTRACT

A learning system with augmented reality is provided. The learning system includes a cloud server recording an operation history of a learner and providing feedback messages, and a mobile device having an image-capturing module capturing an image of a substantial object. Also, the learning system comprises an object database storing a simulated object corresponding to the substantial object, an identification module identifying the image and generating image information, and a processing module which receives and analyzes the image information, obtains the simulated object from the object database according to analyzing results, and displays the simulated object on a display interface of the mobile device. The learning system allows learner to operate simulated object operation instructions on the display interface or directly operate the substantial object to control a display status of the simulated object, and the operation history of learner is transmitted to the cloud server. Learner conducts simulation scientific experiments and substantial operational trainings by operating the simulated object or the substantial object, thereby facilitating learning abstract concepts without being limited by the time and space constraints in a conventional learning system.

10 Claims, 4 Drawing Sheets

LEARNING SYSTEM WITH AUGMENTED REALITY AND RELATED LEARNING METHOD USING MOBILE DEVICE TO CONDUCT SIMULATIONS AND OPERATIONAL TRAINING

CROSS-REFERENCES TO RELATED APPLICATIONS

This application claims under 35 U.S.C. §119(a) the benefit of Taiwanese Application No. 102126615, filed Jul. 25, 2013, the entire contents of which is incorporated herein by reference.

BACKGROUND OF THE INVENTION

1. Field of the Invention

This invention relates to a combination application of mobile technology, cloud technology and augmented reality. The invention also relates more specifically to a learning system with augmented reality and a related learning method applicable to a mobile device to provide a learner with experimental operations.

2. Description of Related Art

With the rapid development of technology, a teaching task can be realized by books and tangible instructional tools. Through the use and assistance of the tangible instructional tool, a teacher's instruction will not be limited by words and graphs and a learner can learn in a more intuitive and thorough way.

In a scientific world, some phenomena are invisible, such as microscopic particles, and appear to be too abstract for beginning learners. Teachers typically teach students through books or computers, and students could only attempt to understand and imagine those phenomena and their related concepts through the pictures and texts on paper or real-time graphs displayed on the computer. However, if the concepts are related to complicated phenomena such as the moving of air particles, then it would be difficult for students to understand these concepts through books and computer only. One feasible solution is to use multimedia to facilitate learning. Yet, multimedia-based learning requires a variety of software, and educational institutions often cannot afford such high cost facilities. In the above-described learning process, both the teacher and the learners are faced with various problems. For example, the available media such as books and graphs could not provide sufficient scaffolding for learners to learn more effectively. Simultaneously, multimedia equipment is usually expensive and unaffordable. Moreover, if the teacher intends to test the learners, paper is usually the only option since other testing methods, such as a computer-based simulation test, are also expensive and constrained by space and time.

Therefore, how to embody the abstract concepts in natural scientific phenomena to provide teachers and learners with a real-time, highly efficient, and uncomplicated teaching, testing and experimental learning mechanism is becoming an urgent issue in the field.

SUMMARY OF THE INVENTION

In view of the above-mentioned problems, the present invention provides a learning system with augmented reality and a related learning method, which combine mobile technology, cloud technology and augmented reality and provide learning, testing and experimental operation learning mechanisms that present abstract concepts.

To achieve the above-mentioned and other educational objectives, the present invention provides a learning system with augmented reality, comprising a mobile device connected to a cloud server via network; the mobile device would be provided to learner to operate and the cloud server would record learner's operation history and provide feedback messages. The mobile device would be equipped with: an image-capturing module that can identify objects being used as instructional tools based on a database that has stored various simulated objects and their corresponding real-world objects; an identification module that identifies the image of the physical object that is captured by the image-capturing module and generates image information; and a processing module that receives and analyzes the image information generated by the identification module, obtains the simulated object corresponding to the substantial object from the object database according to the identification pattern, and displays the simulated object on a display interface of the mobile device, wherein learner is allowed to operate simulated object operation instructions on the display interface or directly operate the 3D object to control a display status of the simulated object corresponding to the physical object, and learner's operation history is transmitted back to the cloud server, and wherein learner conducts simulation scientific experiments and interact with the simulated object or the real-world 3D object.

In an embodiment, the mobile device also includes a communication module, and the processing module would transmit the device's operation history via the communication module to the cloud server.

In an embodiment, the cloud server is made of the following parts: a computation module that analyzes the operation history and generates the feedback messages and history data; a history database that stores the operation history and the history data generated by the computation module; a statistics module that gathers statistics of the history data in the history database and generates learning statistics data; and a feedback module that generates feedback instruction according to the feedback messages generated by the computation module and the learning statistics data generated by the statistics module, and transmits the feedback instruction back to the processing module to provide real-time learning feedbacks.

In an embodiment, learner is allowed to operate the substantial object and capture a new image via the image-capturing module. According to the new image, the display interface would display a new display status of the simulated object.

The present invention further provides a learning method with augmented reality that allows a learner to conduct a learning process via a mobile device, comprising the following steps of: (1) providing a substantial object used as an instructional tool and simulated objects corresponding to the substantial object; (2) setting an interaction relation and a feedback condition of the simulated objects; (3) capturing, by using the mobile device, an image of the substantial object, identifying the image of the substantial object and generating image information, and obtaining the simulated objects corresponding to the substantial object according to the image information and displaying the simulated objects on a display interface of the mobile device; (4) controlling, by a learner, a display status of the simulated objects via simulated object operation instructions displayed on the display interface, or directly operating, by learner, the substantial object to control the simulated objects corresponding to the substantial object, and, recording, by using the mobile device, an operation history of learner; and (5) automatically transmitting the operation history to a cloud server, and analyzing, by the cloud server, the operation history and generating feedback messages for real-time feedbacks and history data for learning statistics.

In an embodiment, the interactive relation and the feedback condition comprise an adjustable parameter, a space interactive relation, and an operation history content ready to be recorded of the simulated objects.

Compared with conventional technique, the learning system with augmented reality and related learning method according to the present invention employ a mobile device to capture an image of a substantial instructional tool, and obtain and display a corresponding simulated object on the mobile device. A learner is allowed to directly operate the substantial instructional tool or control the simulated object to change a formed simulation image. Therefore, an experimental operation learning effect is enhanced. The learning system is applicable to facilitate teaching and testing, and the employment of a substantial instructional tool achieves a demonstration of an abstract object or abstract concept and the learning of experimental operations. The present invention employs the augmented reality techniques to present and simulate the operations of an abstract concept with an intuitive and real medium, so as to help a learner to understand and learn in a spatial interaction manner. With a mobile device, the learning restrictions on time and space can be reduced. With the use of the cloud operations, real-time feedbacks are provided, and learning histories of a plurality of learners can be summarized, thus facilitating our knowledge of learner's learning performance or adjustment of the teaching strategy for learner.

BRIEF DESCRIPTION OF DRAWINGS

The invention can be more fully understood by reading the following detailed description of the preferred embodiments, with reference made to the accompanying drawings, wherein.

DETAILED DESCRIPTION OF THE INVENTION

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
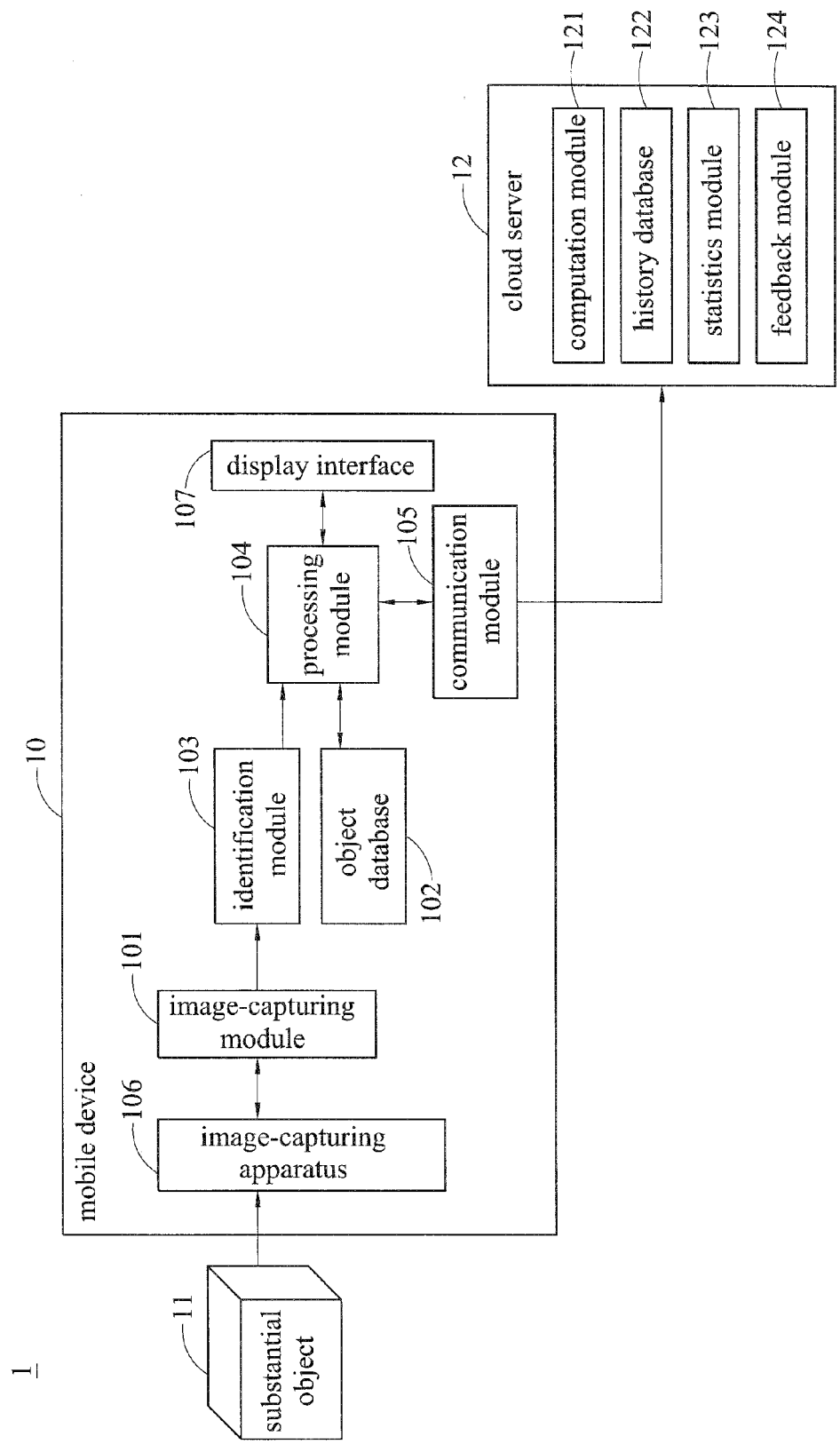
FIG. 1 is a functional block diagram of a learning system with augmented reality of an embodiment according to the present invention.

FIG. 1 is a functional block diagram of a learning system 1 with augmented reality of an embodiment according to the present invention. The learning system 1 allows a learner to conduct an experimental operations via a mobile device 10.

Please note that the mobile device 10 is exemplary, and the learning system 1 according to the present invention is not limited thereto. In an embodiment, the mobile device 10 is an intelligent mobile device. In another embodiment, the mobile device 10 comprises an image-capturing apparatus 106, such as a camera or a video camera, and a display interface 107 for displaying images. In an embodiment, the display interface 107 is an external projector. In another embodiment, the display interface 107 is a display panel of the mobile device 10.

In an embodiment, the learning system 1 with augmented reality comprises the mobile device 10 for learner to operate, and a cloud server 12 that provides cloud service. The cloud server 12 records learner's operation history and provides appropriate feedback messages according to learner's learning situations.

A learner can operate the mobile device 10. In addition to the embedded image-capturing apparatus 106 and the display interface 107, the mobile device 10 has internal processing units that conduct augmented reality and interactive learning. The internal processing unit includes an image-capturing module 101, an object database 102, an identification module 103 and a processing module 104.

The image-capturing module 101 captures an image of a substantial object 11 used as a instructional tool. In practice, the image-capturing module 101 employs the image-capturing apparatus 106 in the mobile device 10 to capture an external object image. The substantial object 11 represents a instructional tool of an object, such as air molecules. Since the air molecules are invisible, the substantial object 11, which has a specific shape or a special pattern, may be utilized to represent the air molecules.

The object database 102 stores a simulated object and an identification pattern corresponding to the substantial object 11. Since the substantial object 11 is designed for presenting an object that is invisible, the substantial object 11 can have various identification patterns to define what the substantial object 11 is. For instance, the substantial object 11 (i.e., the instructional tool) is a 2D object with DNA pattern printed thereon, and learner can use such substantial object 11 to present a simulated object related to DNA. Therefore, as long as the simulated object is stored in the object database 102 in advance and a relation between the substantial object 11 and the simulated object is defined accordingly, when the substantial object 11 is determined, a corresponding simulated object can be found for the presentation. Therefore, the object database 102 can store a plurality of simulated objects that correspond to a plurality of substantial objects 11. The identification pattern will be described in details in the following paragraphs.

The identification module 103 identifies the image captured by the image-capturing module 101 and generates image information. The identification module 103 receives and identifies, from the image-capturing module 101, the image of the substantial object 11 captured by the image-capturing apparatus 106. The identification module 103 identifies what the substantial object 11 is.

The processing module 104 receives and analyzes the image information from the identification module 103, and obtains, from the object database 102, the simulated object corresponding to the captured image of the substantial object 11. In reality, the substantial object 11 is used as a instructional tool and corresponds to a simulated object, such as air molecules. The processing module 104 then displays the simulated object on the display interface 107 of the mobile device 10.

In an embodiment, the substantial object 11 is a 2D substantial object or a 3D substantial object. In another embodiment, the substantial object 11 can have a variety of shapes, as long as the identification module 103 can identify what the substantial object 11 represents. Of course, the substantial object 11 can have its shape be designed to comply with various requirements, and can be adjusted according to design demands of the instructional tool. In an embodiment, surfaces of the substantial object 11 have different patterns for identification, and the identification module 103 identifies an image formed by a single surface of the 2D substantial object or any surface of the 3D substantial object.

Since the object database 102 stores pattern identification information of every surface of the substantial object 11 in advance, the identification module 103 can identify the image captured by the image-capturing module 107, no matter how the substantial object 11 is disposed or moved.

For instance, when the substantial object 11 is a 2D substantial object having a specific pattern on a surface thereof, the identification module 103 can identify what the substantial object 11 represents by simply identifying the specific pattern. In another embodiment, in which the substantial object 11 is a 3D substantial object, such as a hexahedron, and the object database 102 is stored with a specific pattern of any surface of the hexahedron, after the identification module 103 identifies the specific pattern of any surface of the substantial object (e.g., the hexahedron), what the substantial object 11 represents is known.

In a learner's learning operation, learner is allowed to control a status of the simulated object via simulated object operation instructions on the display interface 107. In an embodiment, the simulated object operation instructions indicate a control interface, such as a button, a slide bar or an option, or a graphical interface such as a graph that can be shown on the display interface 107. Learner is allowed to touch or click the control interface or the graphical interface to trigger the operations of the simulated object. For instance, if the simulated object is air molecules, when a button that increases temperature is triggered, air molecules would move faster according to a science principle, that is, as the temperature gets higher, the air molecules would be more active. In such a manner, the display status of the simulated object can be controlled.

In an embodiment, learner is allowed to directly operate the substantial object 11 to change the display status of the simulated object. When learner changes the location or status of the substantial object 11, the image-capturing module 101 captures a new image, and the display interface 107 displays a new display status of the simulated object corresponding to the new image. Hence, learner can move, rotate or calibrate the substantial object 11 directly, and accordingly, the simulated object in the display interface 107 changes correspondingly.

Therefore, with regard to a substantial object representing a simulated matter, learner is allowed to use the learning system 1 to generate a dynamic and interactive simulated object, observe the display status of the simulated object, and change the display status by controlling the simulated object or the substantial object via image capturing, analyzing and displaying processes. Therefore, learner can learn intuitively, without resorting to the descriptions of traditional texts and pictures.

In order to allow learner to obtain real-time feedbacks, or allow a teacher to know the learning situations of learner, and even allow the teacher to track the learning history of learner or gather statistics of the related learning history data, the learning process of learner is transmitted via the mobile device 10 to the cloud sever 12 automatically.

In practice, the communication module 105 in the mobile device 10 transmits the operation history generated by the processing module 104 to the cloud server 12, and the cloud server 12 provides corresponding real-time feedbacks with regard to different operation histories, or records the operation history of learner to further gather statistics or analyzes several operation histories to transform the data into meaningful data for further research and evaluation. In addition to the learner's operation history, the communication module 105 further transmits the image captured by the image-capturing module 101 or the simulated object from the object database 102 to the cloud server 12, so as to provide complete data.

In an embodiment, instead of transmitting the image or the simulated object directly to the cloud server 12, the communication module 105, when being operated, converts history information related to the capturing of the image and the changing of the simulated object into a history record, and the history record is then transmitted to the cloud server 12. For instance, how a learner, when facing a plurality of substantial objects 11 numbered from A-Z, observes simulated objects that the substantial objects 11 represent, what the observation sequence is, and when he observes each of the substantial objects 11 are to be understood. After identifying that the substantial object 11 and the substantial object 11 being identified is changing, the identification module 103 uploads numerals having time stamps, so as to build a history record of image identification. The communication module 105 can be used as a medium for data transmission or message transmission.

The cloud server 12 comprises an computation module 121, a history database 122, a statistics module 123 and a feedback module 124. The computation module 121 analyzes an operation history from the mobile device 10 and generates feedback messages and history data. The history database 122 stores the operation history received by the computation module 121 and the history data generated after analyzing the operation history by the computation module 121. The statistics module 123 gathers statistics of the history data in the history database 122 and generates learning statistics data from the history data. The feedback module 124 generates feedback instructions according to the feedback messages of the computation module 121, and transmits the feedback instructions via the communication module 105 of the mobile device 10 to the processing module 104, such that the display interface 107 or other mechanisms (vibration or sounds) would provide real-time learning feedbacks. Therefore, the cloud server 12 provides a complete record, integrates a learner's learning history, and provides feedbacks according to the learning history.

In other words, the feedback module 124 can also generate feedbacks that can be shared by others according to the statistics module 123. Therefore, the learning system 1 can integrate many learners' learning histories, this stands for the fact that scientific concept is extracted from many accumulated science experimental results. For instance, when a measurement experiment operation is finished and the result is the same as the statistics results of many learning histories, the feedback instructions are transmitted back, and the processing module 104 of the mobile device 10 generates vibration and sounds, informing learner of the operation result. Moreover, the feedback module 124 can also display the integrated data in a page format on a web page, so as to share the integrated data.

In an embodiment, the cloud server 12 can be used as a test record server. Therefore, learner can employ the learning system 1 to conduct a test, and the learner's operation history and test result will be transmitted back to the cloud server 12, for the cloud server 12 to further analyze and gather statistics. In the embodiment, a new testing mechanism is added to the learning system 1, and, as such, the learning system 1 can thus possess both teaching and testing functions. Such learning system 1 operates in a similar way to the previous ones, and thus further description is hereby omitted.

The operations of the learning system 1 will be described with an example in the following description. Air particles are used as a concept to be taught to illustrate the operations of the learning system 1.

Figure 2:
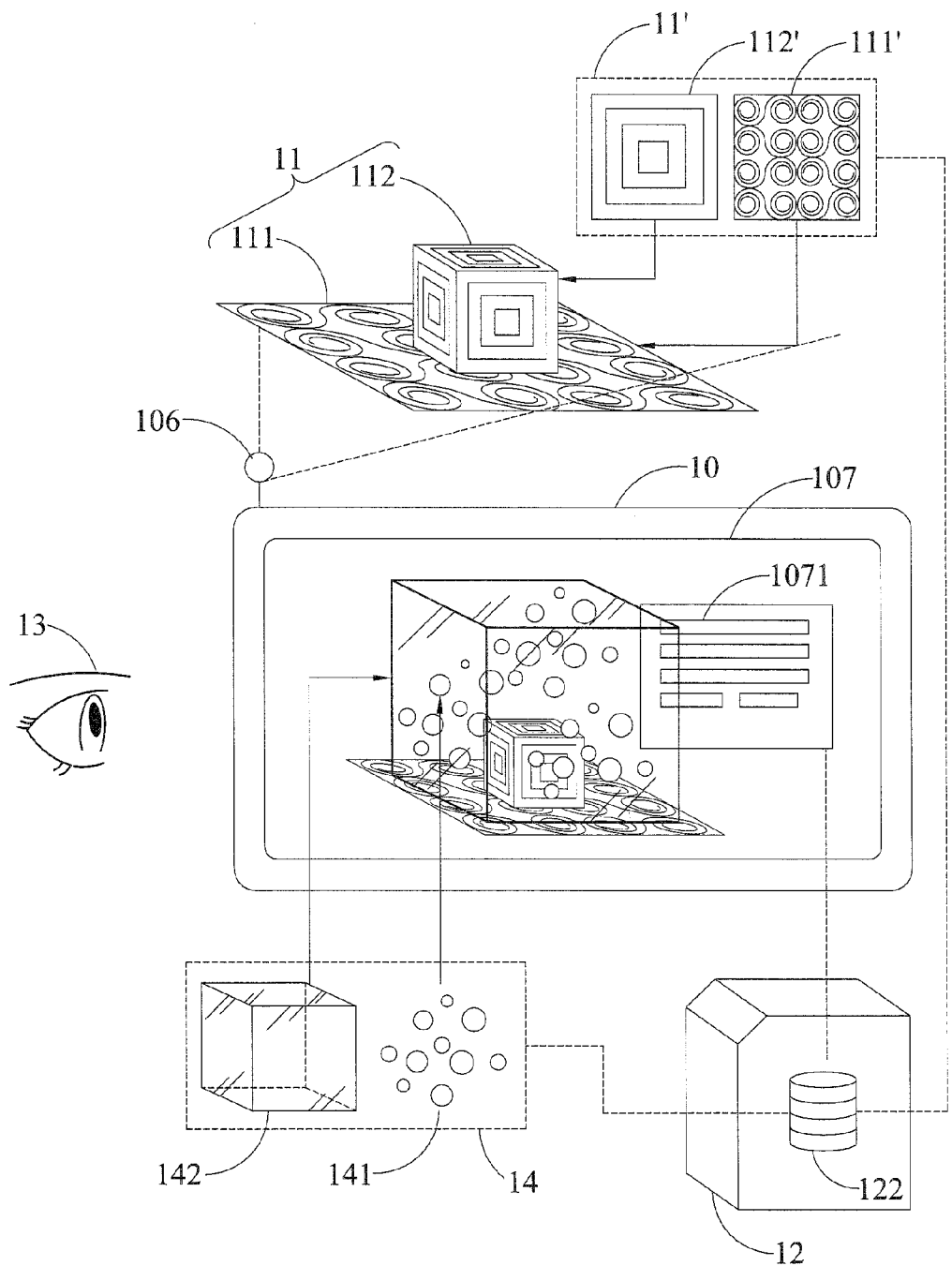
FIG. 2 is a schematic diagram of a learning system with augmented reality of an embodiment according to the present invention.

Please refer to FIGS. 1 and 2. FIG. 2 is a schematic diagram of a learning system 1 with augmented reality of an embodiment according to the present invention. The learning system 1 allows a learner 13 to conduct an operation training of a science experiment. When conducting learning or testing, the learner 13 can employ the image-capturing apparatus 106 of the mobile device 10 to capture an image of the substantial object 11. In an embodiment, the substantial object 11 includes a 2D substantial object 111 and a 3D substantial object 112, which two have different patterns on surfaces thereof. After the image-capturing apparatus 106 captures images of the 2D substantial object 111 and the 3D substantial object 112, the object database 102, after analyzing the images, finds a corresponding simulated object and displays the simulated object on the display interface 107. In an embodiment in which air particles are used as an example, the main objective is to teach the movement of the air particles. The 2D substantial object 111 indicates a glass box, and the 3D substantial object 112 represents the air particles. The display interface 107 displays simulated objects 14 including the 3D air particles 141 and the 3D glass box 142. A learner is allowed to control a status of the simulated objects 14 via the simulated object operation instructions 1071 on the display interface 107.

With regard to the determination of the image of the substantial object 11, when the learner 13 is capturing the image of the substantial object 11 with the image-capturing apparatus 106 of the mobile device 10, wherein the 2D substantial object 111 has an identification pattern 111' and the 3D substantial object 112 has an identification pattern 112', the identification module 103 analyzes the images according to an identification pattern set 11' of the identification patterns 111' and 112'. Since different patterns represent different simulated objects, the processing module 104 can find in the object database 102 corresponding simulated objects 14, i.e., the 3D air particles 141 and the 3D glass box 142. Each of the simulated objects 14 has its own display status information, and the learner 13 is allowed to observe via the display interface 107 that the 3D air particles 141 are trapped in the 3D glass box 142, and move, collide and bounce. Therefore, an invisible microcosmic science phenomenon is embodied. Moreover, the learner 13 is allowed to control the status of the simulated objects 14 via the simulated object operation instructions 1071, e.g., by increasing the temperature or number of the air particles, thus causing the simulated air particles to move in a high speed and collide in a high frequency, so as to achieve the objective of intuitive learning.

The learner 13 is also allowed to conduct experimental operations by manually operating the substantial object 11. For instance, a substantial object (not shown) corresponding to a 3D transparent wall is added. After the substantial object is identified, augmented reality of the 3D transparent wall (not shown) is generated. When the learner 13 manually presses the 3D transparent wall into the 3D glass box 142 (the 3D transparent wall and the 3D glass box 142 can pass through each other), the movement space of the simulated 3D air particles 141 are compressed, and the frequency of collision of the air particles 141 in the simulated 3D glass box 142 is increased, which represents that the pressure in the 3D glass box 142 is increased. Therefore, through the above simulation experiment operations, the learner 13 is allowed to directly operate the substantial object 11, and to achieve the effect of experimental operation training. The identification pattern set 11', the simulated object 14 and the process that the learner 13 executes the simulated object operation instructions 1071 will be recorded and transmitted to the history database 122 of the cloud server 12, for further researches.

Figure 3:
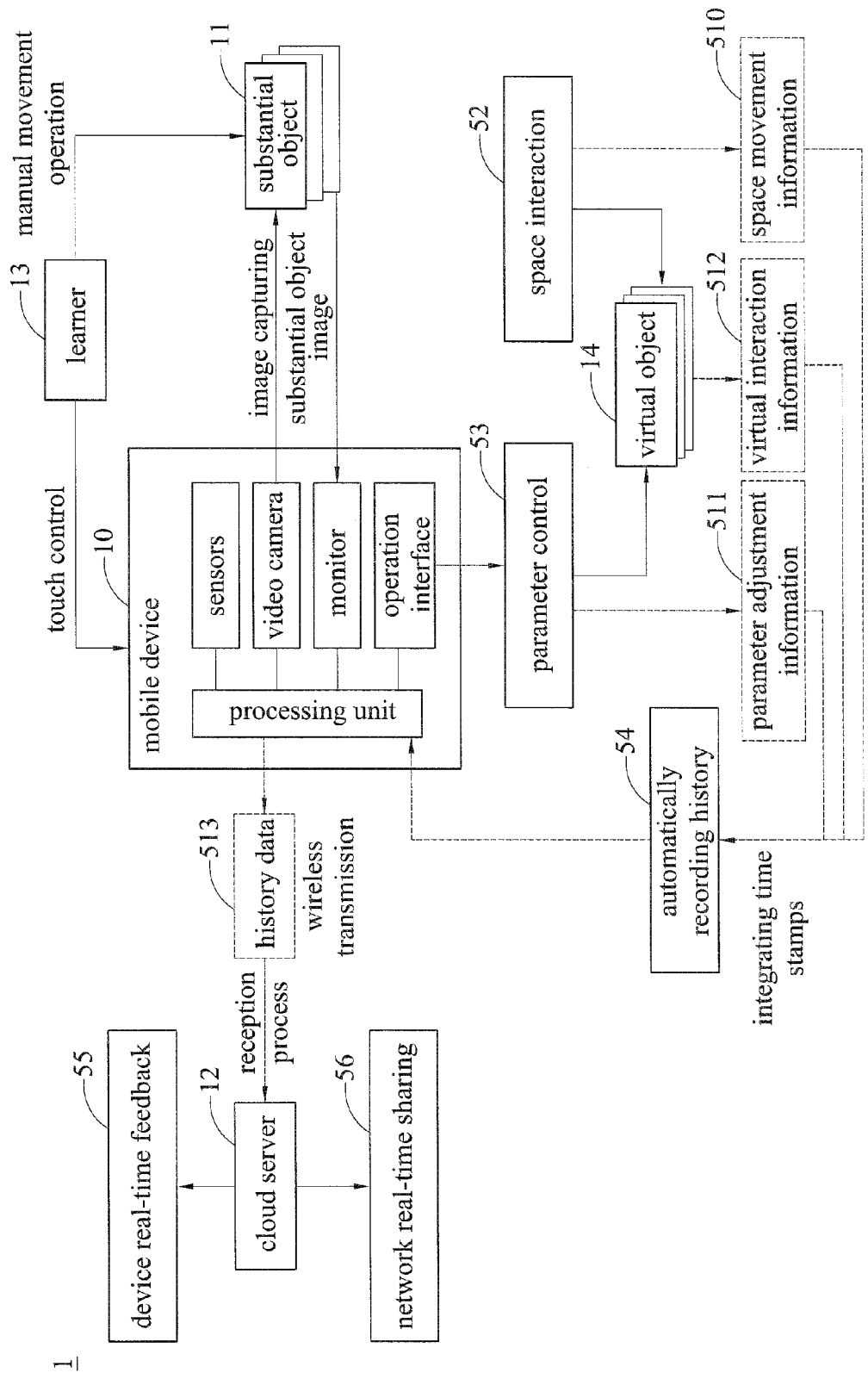
FIG. 3 is a functional block diagram schematically illustrating an operation of a whole structure of a learning system with augmented reality according to the present invention.

FIG. 3 is a functional block diagram of a learning system 1 with augmented reality according to the present invention. The learning system 1 allows the learner 13 to conduct operation training of science experiments. An image-capturing apparatus (e.g., a video camera) installed in the mobile device 10 captures an image of the substantial object 11, and analyzes the captured image to find a corresponding simulated object 14. The simulated object 14 is displayed on a monitor, for the learner 13 to observe and learn.

When learning the simulated object 14, the learner 13 can touch and control a button, a slide bar or an option on an operation interface of the mobile device 10, to control a status of the simulated object 14 via a parameter control 53. Alternatively, the learner 13 can hold, move and control the substantial object 11 in a space interaction 52 manner, such as moving, rotating and calibrating actions to operate the substantial object 11. In other words, the learner 13 is allowed to directly control the substantial object 11 in a real space to change the simulated object 14 indirectly, so as to achieve the objective of interaction. In addition, in order to record the learner's 13 learning controlling actions, sensors in the mobile device that sense direction, acceleration, brightness and distance can be used to sense the learner's 13 controlling process on the mobile device 10.

During the interaction process, the space interaction 52 and the parameter control 53 conducted by the learner 13 and the status change generated by the simulated object 14 generate space movement information 510, parameter adjustment information 511 and simulated interaction information 512, respectively. The space movement information 510 represents 3D coordinate information of the simulated object successively transmitted when the corresponding substantial object 11 is identified successfully. The parameter adjustment information 511 is a status value of the simulated object 14 that corresponds to an operation interface. The simulated interaction information 512 is results of an interaction relation generated by a certain design including contact (e.g., the surfaces of the simulated objects collide), combination (e.g., the simulated objects 14 engage with respect to shapes or correspond with respect to spaces), and overlap (e.g., the spaces of the simulated objects are stacked on one another) of the simulated objects 14, rather than the information related to the change of the simulated object 14 itself. The above data is recorded in an automatically recording history 54 process as three history data 513 having a time direction that are generated by automatically providing time stamps to information generated by an interaction process and integrating the information. In the embodiment, in which the 3D transparent wall is added to the experimental operation, space movement information 510 of the 3D transparent wall is generated, the collision frequency is increased because the space in which the air particles move is reduced, and the simulated interaction information 512 that has collision frequency changed is generated. The above two information and the parameter adjustment information 511 that is generated when the parameter control is conducted are integrated as the history data 513.

The history data 513 can be transmitted wirelessly to the remote cloud server 12, and the cloud server 12 can conduct applications, such as a device real-time feedback 55 and a network real-time sharing 56. The device real-time feedback 55 indicates that the learner 13 is feedback by vibration, sounds and animation effects and informed of his learning situation and his comparison result with other learners. The network real-time sharing 56 indicates updating the history data 513 of a plurality of mobile devices 10 (i.e., of a plurality of learners) via web pages or mails, in order to provide a learning grade to the learner 13, and allow the teacher to gather statistics and conduct quantitative research.

The present invention creates a new-type teaching and testing system by integrating a variety of technology concepts, such as intelligent mobility, augmented reality and cloud operations. Abstract science concepts and invisible microcosmic phenomena (e.g., air particles movement) can thus be embodied and controlled with the aid of experiments, which helps learner to learn, reduces the cost, and brings more convenience. By using the cloud operations to record the history data, the objectives of network real-time sharing and analysis statistics can be achieved, which can be employed in research and analysis.

Figure 4:
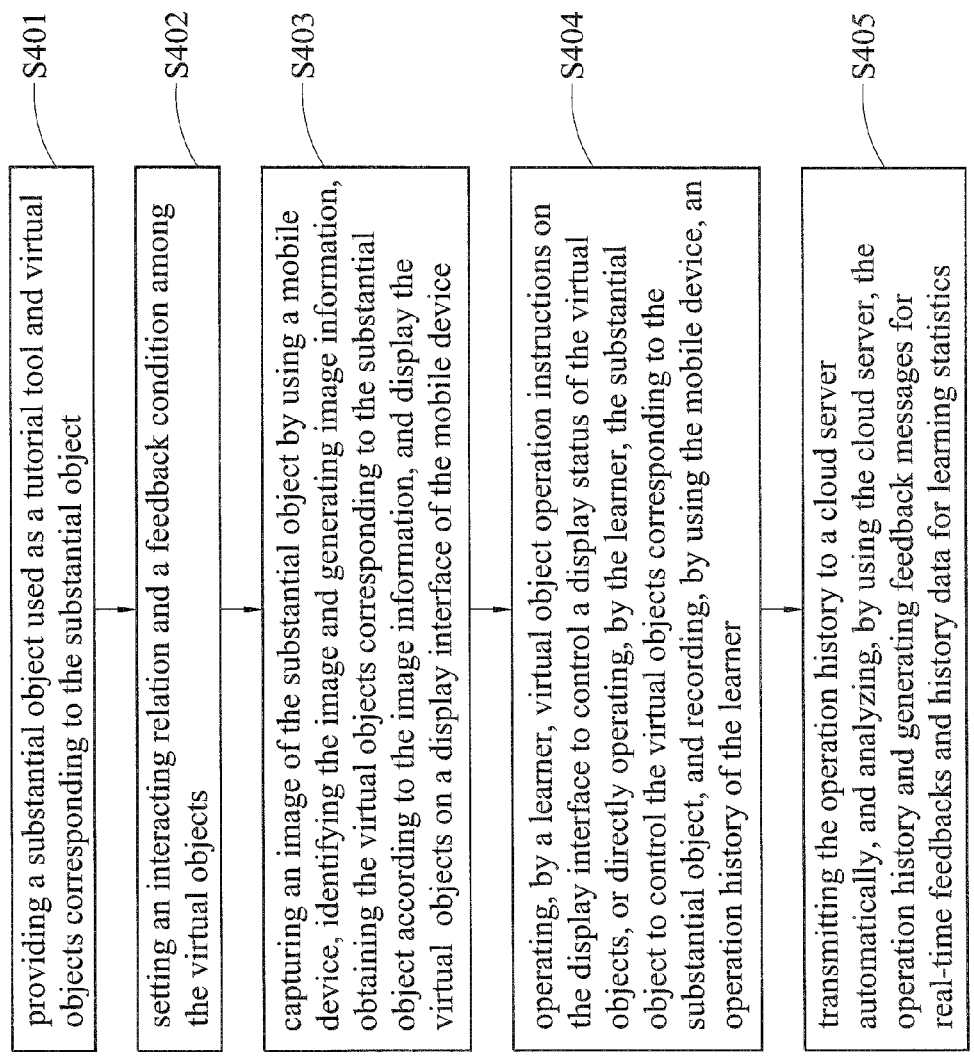
FIG. 4 is a flow chart of a learning method with augmented reality of an embodiment according to the present invention.

FIG. 4 is a flow chart of a learning method with augmented reality of an embodiment according to the present invention. The learning method is embodied through the use of a mobile device. In step S401, a substantial object used as a instructional tool and simulated objects corresponding to the substantial object are provided. In an embodiment, step S401 further comprises fabricating the simulated objects and an identification pattern, wherein the simulated objects are a 2D or 3D computer graphs, animation or films, the identification pattern is a black-white or highly-complicated color natural image, a corresponding relation of the simulated objects and the identification pattern is defined, the simulated objects can display dynamic or static display statuses, and the simulated objects and the identification pattern will be recorded in an object database.

In an embodiment, the substantial object fabricated to be the instructional tool comprises a 2D substantial object and a 3D substantial object, both of which comprise identification patterns on surfaces thereof, as a basis for the simulated objects to form an image. The method proceeds to step S402.

In step S402, an interaction relation and a feedback condition among the simulated objects are set. In other words, the interaction relation among the simulated objects and the feedbacks provided under different operations are set in advance. In an embodiment, an adjustable parameter and a space interaction relation are included, the adjustable parameter includes a natural status, such as temperature, pressure and density and can be operated by controlling options on a display interface, and the space interaction relation indicates the relation of the simulated objects, such as the facts that simulated air particles collide or are enclosed by a simulated glass box. The method proceeds to step S403.

In step S403, the mobile device captures an image of the substantial object, identifies the image of the substantial object and generates image information, obtains the simulated objects corresponding to the substantial object according to the image information, and displays the simulated objects on a display interface of the mobile device. Learner is allowed to capture an image of the substantial object with the image-capturing apparatus of the mobile device. The image can be identified according to the identification patterns on a single surface of the 2D substantial object or any surface of the 3D substantial object.

The image, after being captured, can be identified and analyzed, i.e., identifying what the pattern on the surface of the substantial object is, to obtain a simulated image corresponding to the substantial object. The simulated objects are displayed on the display interface of the mobile device. Learner is thus allowed to observe the image of the simulated objects on the display interface. The method proceeds to step S404.

In step S404, the learner controls the display status of the simulated objects via the simulated object operation instructions on the display interface, or controls the simulated objects corresponding to the substantial object by directly operating the substantial object. The mobile device records the learner's operation history. Step S404 illustrates that the simulated objects are displayed on the display interface of the mobile device, and the display status of the simulated objects can be controlled via adjustable parameters that are installed in advance to control the display statuses or interaction conditions of the simulated objects. The corresponding display statuses and the interaction conditions are also recorded as the learner's operation history.

The learner is allowed to control the display status of the simulated objects via a visualized operation interface on the display interface such as simulated object operation instructions, or change the status of the substantial object directly by changing the status of the substantial object in a real space by moving, rotating and calibrating manners. The display interface will display a new status as the status of the simulated objects are changed. Accordingly, the mobile device, when operating in an image-capturing mode, will keep capturing the image of the substantial object, and keep identifying whether the image exists, so as to keep updating the position of the simulated objects corresponding to the substantial object in the real space. In an embodiment, the mobile device has hardware that keeps capturing images in a high speed, and software that keeps performing a redrawing process. The method proceeds to step S405.

In step S405, the operation history is transmitted to a cloud server automatically. The cloud server analyzes the operation history and generates feedback messages for real-time feedbacks and history data for learning statistics. In order to achieve the objectives of real-time feedbacks and data analysis statistics, the learning method according to the present invention transmits the operation history to the cloud server, and the cloud server analyzes the operation history and generates feedback messages and history data. As described previously, the learner's operation history can be recorded and stored in the cloud server. In addition to providing real-time feedbacks and interaction, the data can be analyzed to gather statistics as a basis for improving teaching or testing processes.

A learning system with augmented reality and a related learning method according to the present invention embody an invisible teaching content via an augmented reality mechanism, so as to achieve a better learning effect. In particular, the present invention employs augmented reality to focus on a learner's experimental operations, i.e., conducting simulated experimental operation trainings with augmented reality as a medium, which is different from the teaching contents provided by books, graphs or films. The learning system according to the present invention further provides testing, and frees learner from the limitation of the conventional paper-based tests, such that learner can obtain the real-time feedback testing result, which is beneficial to the teaching and testing.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A learning system with augmented reality, comprising:
a cloud server that records a learner's operation history and provides feedback messages; and
a mobile device for the learner to operate and configured to perform a learning method with augmented reality, the learning method comprising:
storing a simulated object and an identification pattern corresponding to a substantial object;
capturing an image of the substantial object used as an instructional tool;
identifying the image of the substantial object that is captured to generate image information; and
analyzing, by a processor of the mobile device, the image information to obtain the simulated object corresponding to the substantial object according to the identification pattern, and displaying the simulated object on a display interface of the mobile device, wherein the learner is allowed to operate simulated object operation instructions on the display interface or directly operate the substantial object to control a display status of the simulated object corresponding to the substantial object, and the learner's operation history is transmitted back to the cloud server, and wherein the learner conducts simulation science experiments and substantial operational trainings by operating the simulated object or the substantial object.

2. The learning system of claim 1, wherein the substantial object comprises a 2D substantial object and a 3D substantial object, and identifying the image of the substantial object comprises identifying an image formed by a single surface of the 2D substantial object or any surface of the 3D substantial object.

3. The learning system of claim 1, wherein the mobile device further comprises a communication module, and the operation history is transmitted to the cloud server by the communication module.

4. The learning system of claim 3, wherein the cloud server performs an analyzing and feedback process, the analyzing and feedback process comprising:
analyzing the operation history to generate the feedback messages and history data;
storing the operation history and the history data;
gathering statistics of the history data to generate learning statistics data; and
generating a feedback instruction according to the feedback messages and the learning statistics data generated, and transmitting the feedback instruction back to the mobile device for providing real-time learning feedbacks.

5. The learning system of claim 1, wherein the simulated object operation instructions comprise a button, a slide bar or an option to control the display status of the simulated object.

6. The learning system of claim 1, further comprising capturing a new image when the learner is operating the substantial object, wherein the display interface displays a new status of the simulated object according to the new image.

7. A learning method with augmented reality that allows a learner to conduct a learning process via a mobile device, comprising the following steps of:
(1) providing a substantial object used as an instructional tool and simulated objects corresponding to the substantial object;
(2) setting an interaction relation and a feedback condition of the simulated objects;
(3) capturing, by using the mobile device, an image of the substantial object, identifying the image of the substantial object and generating image information, and obtaining the simulated objects corresponding to the substantial object according to the image information and displaying the simulated objects on a display interface of the mobile device;
(4) controlling, by a learner, a display status of the simulated objects via simulated object operation instructions on the display interface, or directly operating, by the learner, the substantial object, to control the simulated objects corresponding to the substantial object, and recording, by using the mobile device, an operation history of the learner; and
(5) automatically transmitting the operation history to a cloud server, and analyzing, by the cloud server, the operation history and generating feedback messages for real-time feedbacks and history data for learning statistics.

8. The learning method of claim 7, wherein the substantial object comprises a 2D substantial object and a 3D substantial object, and the step (3) further comprises identifying an image formed by a single surface of the 2D substantial object or any surface of the 3D substantial object.

9. The learning method of claim 7, wherein the step (4) further comprises capturing a new image according to changing, made by the learner, a status of the substantial object, and displaying, by using the display interface, a new status of the simulated objects according to the new image and a space interaction status with other simulated objects.

10. The learning method of claim 7, wherein the interaction relation and the feedback condition comprise an adjustable parameter, a space interaction relation, and an operation history content ready to be recorded of the simulated object.

* * * * *